April 4, 1933. F. L. SESSIONS 1,903,359
METHOD OF AND APPARATUS FOR ELECTRIC WELDING AND HEATING OF METALS
Filed Aug. 26, 1929
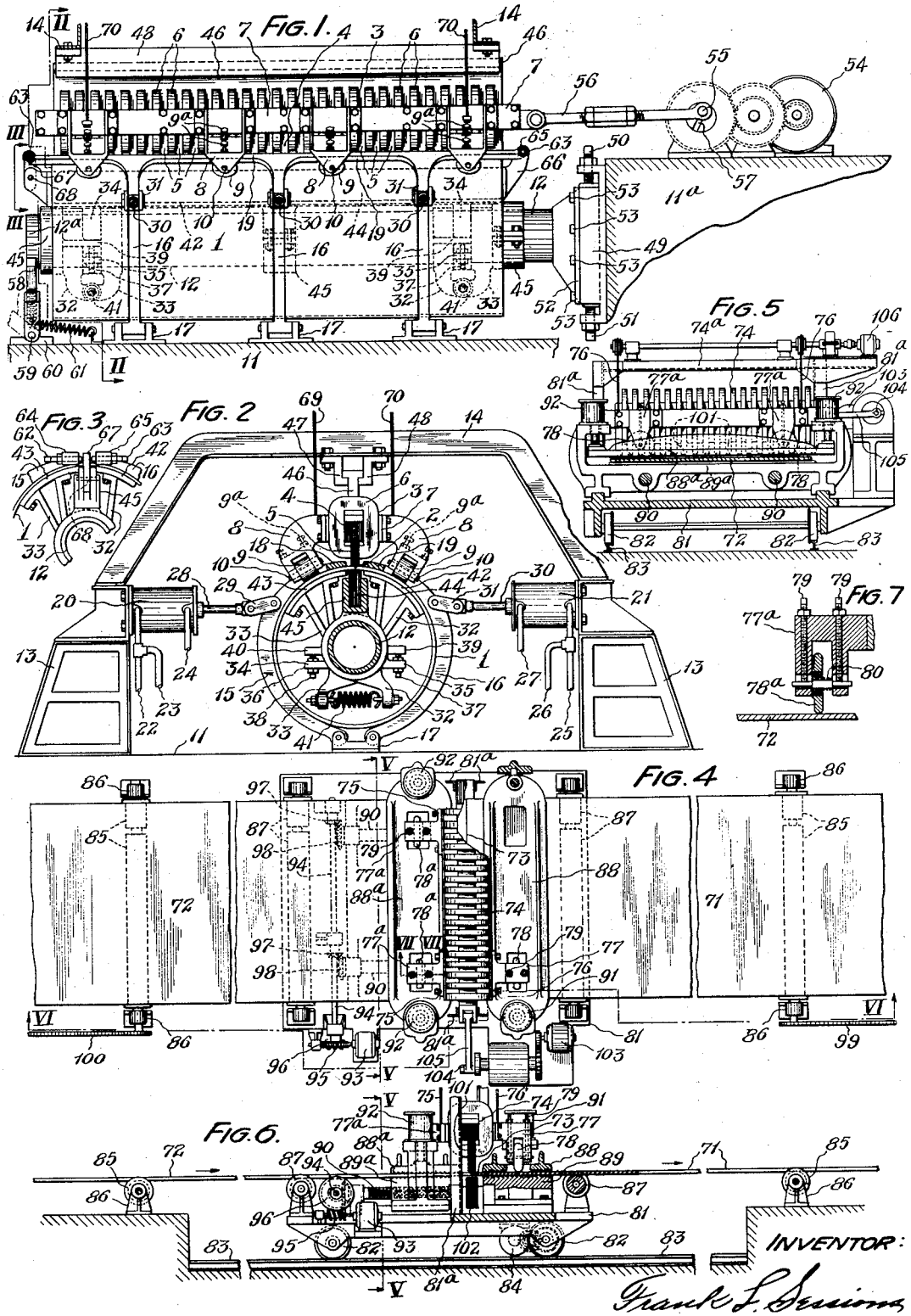
INVENTOR:
Frank L. Sessions Patented Apr. 4, 1933

1,903,359

UNITED STATES PATENT OFFICE

FRANK L. SESSIONS, OF LAKEWOOD, OHIO

METHOD OF AND APPARATUS FOR ELECTRIC WELDING AND HEATING OF METALS

Application filed August 26, 1929. Serial No. 388,548.

My invention relates to methods of and apparatus for electric induction welding and heating of metals and utilizes some of the principles of my Patents Nos. 1,365,198 and 1,365,199, issued to me January 11, 1921. In my aforesaid patents I have shown and described a method and apparatus for progressively welding or heating metal by electric currents induced in the work by causing the magnetic lines of a field or plurality of fields of rapidly alternating magnetic force to "cut" the work as progressive, relative traversing movement is effected between the work and the lines of force.

In my present invention I utilize some of the principles disclosed in my aforesaid patents and have shown an inducing unit of the type shown and described in my copending application Serial No. 377,423, filed July 11, 1929, but it will be understood that any suitable construction of inducing unit may be employed. Reference is also made to my copending application Serial 387,757, filed August 22, 1929. In both of the above mentioned copending applications I have shown and described apparatus suitable for carrying out the method of controlling the magnitude of the induced current flowing in the work by varying an otherwise constant air gap between magnetic cores on opposite sides of the work. This subject matter is not claimed in the present application but is claimed in the aforesaid applications. Instead of causing only continuous progressive relative movement of the work and the field or fields of force in a direction parallel to the seam to be welded as in the patents and applications above mentioned, in the present invention I cause relative reciprocating or short, shifting movements of the work and the field or fields of force, the extent of such movements being such as to cause all of the metal of the work which is subtended by the inducing unit to be subjected to substantially the same heating effect.

This will be accomplished when the zones of induced current flow in the work meet or slightly overlap with each shift or reciprocation. When the poles are of the same width as the spaces between them, the extent of shifting may be substantially half the pitch of the poles. If desired there may be a pause, "dwell" or other variation in the relative reciprocating movements and such variation may be caused by any suitable means. Also the reciprocating movements need not be necessarily movements back and forth on a straight line, as it is obvious that the field or fields of force may move forward on one path and back on another path, neither of which paths need be a straight line. For example, a magnetic field may be reciprocated through a circular or elliptical path.

While it is possible to reciprocate the work relatively to the inducing unit, or, to reciprocate the inducing unit relatively to the work, or, to reciprocate both the work and the inducing unit, I have illustrated in the accompanying drawing apparatus in which the inducing unit is reciprocated relatively to the work.

The relative reciprocation of the work and the field or fields of force is for the purpose of subjecting every portion of length of the work that subtends the inducing unit to substantially the same heating effect as every other portion in order that the temperature of the work may be uniform. If desired the work may be traversed past the inducing unit while the latter is being reciprocated and such traversing movement may be either parallel or transverse to the direction of such reciprocations. For instance, in the welding of long seams, or in heating strips of metal the inducing unit may be relatively short and the work may be progressively traversed past the reciprocating inducing unit in a direction parallel to the reciprocations, while in the heating of sheets or plates the work may be traversed past the inducing unit in a direction transverse to the reciprocating movement of the inducing unit. By the expression "in a direction transverse to the reciprocating movement", I refer to movement in any direction other than parallel to the reciprocating movements.

Among the objects of my invention are the provision of a method and means for heating metal by induced electric current by causing a magnetic field of force to cut the work while causing relative reciprocating movements of the work and said field; the provision of a method of heating metal by causing a plurality of spaced, rapidly alternating, magnetic fields to cut the metal to induce electric currents to flow in it, and simultaneously causing relative reciprocating movements of the metal and the magnetic fields of force in the direction of the spacing of the magnetic fields; the provision of means to support and reciprocate the inducing unit in current inducing relation to the metal constituting the work; the provision of means for supporting work having an open seam to be welded adjacent to the pole faces of the inducing unit with the seam extending across the plurality of magnetic fields; the provision of means for pressing together the surfaces of the seam to be welded; the provision of means for causing relative movement of the work and the magnetic field or fields either parallel or transversely to the direction of relative reciprocation of the work and the magnetic fields; and the provision of a method of and means for causing metal to be cut by a plurality of spaced magnetic fields disposed transversely to the direction of the relative movement of the metal and the fields.

By the expression "simultaneously causing relative reciprocating movements", as used above and in the claims I do not mean that the operations necessarily start at the same time, but merely that for the required period of time during the process the operations are taking place or being carried on together, as will be understood. This same explanation applies also to my use of the expression "simultaneously causing progressive, relative traversing movement".

In the drawing Fig. 1 is a side elevation of a machine embodying my invention adapted to weld relatively large diameter pipes or cylinders.

Fig. 2 is a section on line II—II of Fig. 1.

Fig. 3 is a fragmentary view on line III—III of Fig. 1.

Fig. 4 is a plan of a machine embodying my invention adapted to weld transverse seams in plates or to progressively heat them.

Fig. 5 is a view partly in section on line V—V of Fig. 4.

Fig. 6 is a view partly in section on line VI—VI of Fig. 4.

Fig. 7 is a fragmentary section on line VII—VII of Fig. 4.

Referring to Figs. 1, 2 and 3, 1 is a pipe or cylinder constituting the work having an open longitudinal seam 2 to be welded. 3 is the inducing unit comprising a core 4 of laminated sheet iron or steel which has spaced poles 5 extending downwardly like the teeth of a comb into proximity with the outer surface of the work 1 adjacent to the seam 2. Electric coils 6 surround the core 4 and occupy the spaces between the poles 5. These coils may be wound with any suitable number of turns and be supplied with alternating electric current from any suitable source. They should be so connected that when they are energized adjacent poles of the magnetic core will be of opposite polarity. The alternating current supplied to the induction coils 6, as will be understood, may be of any available commercial frequency or may be of relatively high frequency depending upon the work to be done and the conditions under and for which the apparatus is installed. It will be understood by those skilled in the art that the higher the frequency the smaller the quantity of iron required for the magnetic cores of the inducing unit.

A supporting frame 7 is provided for the inducing unit 3. It should be made preferably of non-magnetic material properly insulated from the coils 6 and core 4 where necessary, and also be so constructed that no harmful induced currents can flow in it. This supporting frame 7 may be provided with roll supporting arms 8 for carrying rollers 9 which may be suitably mounted for rotation upon shafts 10.

The machine may be mounted upon a suitable bed or foundation 11 preferably having a portion 11a extending upwardly at one end. To this portion 11a there may be secured a supporting bar 12 adapted to extend longitudinally through the cylinder to be welded and form a support for certain parts of the apparatus and to assist in supporting the work as will be described. Suitable floor stands or frames 13 may be provided for supporting the overhead cross frames 14 above the work. In the drawing two such cross frames 14 are shown but it will be understood that more may be provided at spaced intervals along the length of the work if desired.

Means for assisting in supporting the work and for pressing the seam edges together during the welding operation are provided in the form of preferably skeleton cylindrical clamps 15 and 16 which may be hinged at their lower ends to suitable floor plates or other supports 17. The clamping member 15 has an integral longitudinal bar 18 extending along the work longitudinally of the seam and the clamping member 16 has a similar bar 19 disposed on the opposite side of the seam and also extending longitudinally throughout the length of the work.

These clamping members 15 and 16 may be operated by any suitable power device and for this purpose I provide series of fluid pressure cylinders 20 and 21 upon opposite sides of the machine having suitable pipe connections 22, 23, 24 and 25, 26 and 27 extending to control valves (not shown) that control the admission and exhaust of pressure fluid into the cylinders 20 and 21 to cause their pistons to be advanced or retracted in known manner. The pistons in cylinders 20 are connected by means of piston rods 28 and connecting links 29 to the clamping member 15. Similarly, piston rods 30 and links 31 connect the pistons in cylinders 21 to clamping member 16. It will be understood by those skilled in the art that such cylinders may be used on only one side of the work with the other side of the work held fixed. It will also be understood that various other means, such as a strictly mechanical means, may be used to perform the functions of such cylinders.

Mounted upon bar 12 for limited rotation thereon are pairs of shoe carrying levers, each pair being composed of the levers 32, 33. These levers are spaced axially of the bar 12 to accommodate a collar 34 which is fixed rigidly to the bar 12 and is provided with ears 35, 36 in which are mounted adjustable stop screws 37 and 38 adapted to engage ears 39 and 40 which are formed upon levers 32 and 33 respectively as clearly shown in Fig. 2. A spring 41 connects the ends of the shoe carrying levers 32, 33 and tends to spread their upper ends apart until the ears 39 and 40 are arrested by the ends of adjustable stop screws 37 and 38. Shoes 42 and 43 whose peripheries are shaped to conform to the inner periphery of the cylinder constituting the work are provided upon the ends of levers 32, 33 for assisting in supporting the work and for maintaining in proper alignment the edges of the seam to be welded. It will be understood that as many pairs of levers 32, 33 may be employed as may be desirable to properly support the work.

A laminated magnetizable core 44 may be provided and it may be supported by suitable brackets 45 mounted upon the shaft 12. This core 44 reduces the reluctances of the circuits of the magnetic fields of the inducing unit.

Secured to the frame 7 of the inducing unit is a longitudinal guide bar 46 which extends upwardly between and is guided by guides 47, 48 which are carried by the frames 14.

The bar 12 is preferably vertically adjustable in its end support 49 rigidly mounted on the portion 11a of the foundation to accommodate different diameters of work and to permit the adjustment of bar 12 to suit the height of the work. Adjusting screws 50 and 51 are provided to accomplish this adjustment in known manner and clamps 52 and cap screws 53 may be provided to clamp the bar in adjusted position.

For the purpose of reciprocating the inducing unit 3 any available power supply may be utilized. I have shown an electric motor 54 conventionally geared to operate a crank 55 which is connected by means of an adjustable connecting rod 56 to one end of the frame 7 of the inducing unit 3. When the motor 54 is operated the inducing unit will be reciprocated back and forth above the work and supported upon rollers 9 which are adjustable by means of screws 9a to provide the desired clearance between the ends of pole pieces 5 and the work 1, or to provide means for varying the air gap between the poles 5 and the magnetic core 44 to change or vary the rate of heating. Preferably the throw of crank 55 may be varied by moving and locking the crank pin in the slot 57 provided in the crank disc for accomplishing this purpose in known manner. For supporting the outer end 12a of the bar 12 there may be provided a vertically adjustable rest 58 which is pivoted at 59 to a floor bracket 60 and held in vertical position by means of a spring 61, but which may be rotated to the left into a horizontal position to permit the placing and removal of the work into and out of the machine.

As a gauge for determining when the cylinder has been sufficiently compressed during the welding operation, I prefer to provide adjustable screw stops 62, 63 as shown in Fig. 3. These screw stops are threaded through ears 64 and 65 of bars 18 and 19 respectively and the inner ends of stop screws 62, 63 at one end of the bars 18 and 19 are adapted to engage a projection 66 upon the bracket 45 which is secured to the bar 12. Projection 66 is rigidly fixed to bracket 45 but at the other end of the machine a movable stop 67 is loosely pivoted at 68 to ears formed upon the support 45 so that it may be rotated out of the way when the work is being placed in or removed from the machine.

For the purpose of supporting the inducing unit when there is no work in the machine, means may be provided such as the rods or cables 69 and 70 which are secured to the frame 7 and may be pivoted to or suspended from any suitable overhead support so that the inducing unit may be reciprocated.

It will be understood that the rods or cables 69 and 70 may be made adjustable in length in any convenient manner.

The operation of the apparatus shown in Figs. 1, 2 and 3 is as follows:

The inducing unit and bar 12 having been set in the proper position for receiving the cylinder to be welded, the pivoted movable stop 67 and the supporting rest 58 are both thrown to horizontal positions and the cylinder is inserted into the machine longitudinally of the bar 12. When it is in the position shown in Fig. 1 with the seam uppermost and approximately central with the pole pieces 5 its inner surface will rest upon the shoes 42 and 43 and its outer surface may rest upon the clamps 15 and 16. The center rest 58 and movable stop 67 are next set vertically. Clamps 15 and 16 are then operated by admitting relatively low pressure through, say, the pipes 22 and 25, to bring the edges of the seam cleft 2 into contact. The motor 54 is now started and the inducing unit is thereby reciprocated. The electric circuit through the coils 6 will next be completed by means of suitable switching devices and currents will be induced to flow in the work across the seam 2 and heat it to welding temperature. As the metal is heated the pressure in the cylinders 20 and 21 may be increased by admitting high pressure fluid through, say pipes 23 and 26, so that when welding temperature is reached at the seam edges they will be forced together by means of the clamps 15 and 16 and the weld completed. The current is then shut off and the reciprocating movement of the inducing unit is stopped. It is obvious that the current may be cut off either before, during or after the application of the final pressure, as will be understood by those familiar with pressure and flash welding. Likewise, it will be understood that the reciprocating movements may be stopped when the current is cut off, or before or after the current is cut off. If desired, the reciprocating movements need not be stopped while the work is being fed into or out of the machine. On the other hand, it is equally possible under some conditions to turn on the current before staring the reciprocating movements. Any desired correlation of the current, pressure and time may be used to make either an ordinary butt weld, or a flash weld, or any desired variation of either of these well known types of welds. The clamps 15 and 16 are then released by admitting pressure fluid through the pipes 24 and 27 and permitting the fluid that is in the other ends of the cylinders 20 and 21 to pass out through the pipes 22, 25 or 23, 26, and the welded cylinder is withdrawn endwise out of the machine. In this movement of the cylinder the rest 58 and the movable stop member 67 are rotated into horizontal position to permit the cylinder to pass over them.

In Figs. 4, 5, 6 and 7 there is shown apparatus adapted to weld transverse seams in plates or bars or to progressively heat such articles. In the drawing, 71 and 72 represent two plates having their ends butted together for welding at 73. The inducing unit 74 may be constructed similarly to the inducing unit 3 and may be suspended from an overhead support 74a by means of cables or other adjustable hangers 75, 76. Roll carrying brackets 77, 77a may be secured to the frame of the inducing unit and have mounted in them rolls 78 and 78a respectively which may be vertically adjustable by means of screws 79. The rolls 78 and 78a may have oval faces and rolls 78a may have axial play in the bracket 77a. Springs 80 may be provided to normally hold rolls 78a at the limit of their axial movement toward the direction from which the plate 72 approaches the inducing unit. The rolls 78, 78a are shown as adjusted to roll upon the top surface of the work plates 71, 72, and when so adjusted they limit or determine the distance between the ends of the magnetic poles 101, and the magnetic core 102 which is mounted upon truck frame 81. When progressive heating of the work is to be done the rolls 78, 78a may be adjusted so as not to contact with the work plates or adjusted to make only light contact with them. The inducing unit will then have to be entirely or almost entirely supported by the hangers 75, 76. The rolls 78, 78a, having rounded faces may bear lightly upon the work while it is being moved past the reciprocating, inducing unit.

The inducing unit is preferably carried upon a truck frame 81 which may have standards 81a, for the overhead support 74a from which the adjustable hangers, 75, 76 are suspended. The frame 81 has truck wheels 82 supported upon rails 83 which extend longitudinally in the direction of the travel of the plates 71 and 72. This truck frame 81 may be provided with means for propelling it along the rails 83 and for this purpose a motor 84 is conventionally shown geared to one of the axles that carries wheels 82. Supporting rollers 85 mounted upon stationary standards 86 may be provided for supporting the work plates as they approach and leave the inducing unit and other supporting rollers 87 may be provided upon the truck for supporting the work plates. The rollers 85 and 87 may have flanges adapted to engage the edges of the plates to guide them in their movements. Pairs of suitable work clamping jaws 88, 89, 88a, 89a, may be provided for clamping the work plates in order that welding pressure may be applied to the seam 73. The pair of clamping jaws 88, 89 is mounted upon the truck and rigidly held against movement longitudinally of the work while the pair of clamping jaws 88a, 89a is mounted upon the truck in such a manner that it may be moved longitudinally of the truck by means of suitable pressure adjusting screws 90.

The jaws 88 and 88a are vertically adjustable and any suitable means for raising and lowering them may be provided. Fluid pressure cylinders 91 have their pistons connected to the jaws 88 and similar cylinders 92 have their pistons connected to jaws 88a for this purpose. The control of these pistons by suitable valves and pipe connections will be understood. To adjust the pair of jaws 88a, 89a longitudinally of the work in order to press the edges of the plates firmly together during the welding operation any suitable means may be employed. In the drawing there is shown a motor 93 mounted upon the truck frame 81 and connected to rotate a shaft 94 by means of a worm 95 and worm wheel 96 in known manner. The shaft 94 may be geared in any suitable manner as by the bevel gears 97 and 98 to rotate screws 90 to move clamp jaws 88a, 89a, longitudinally of the work to exert pressure upon seam 73 when the jaws are gripping the work plates. Any suitable means may be employed for feeding the plates to and taking them away from the machine. For instance, rolls 85, or others so placed as to support the plates in the line of their movement to and from the machine may be rotated by power in known manner to move the work to the welding place, if the work is to be welded, or to move the work progressively past the inducing unit if the work is to be progressively heated. In Fig. 4, chain drives 99 and 100 are conventionally shown for driving the rolls 85. It will be understood that the clamp jaws 88, 89 and 88a, 89a, must be open during the feeding movement of the work.

By making the track rails 83 of sufficient length, the welding together of work plates or other articles may be done while the work is moving and without interrupting its movement. To so weld plates 71 and 72 while they are being conveyed by rolls 85, 87, the carriage or truck frame 81, bearing the inducing unit and work clamping jaws is first moved to a position far enough to the left as seen in Fig. 6, to provide sufficient length of track to the right to permit the carriage to travel continuously in that direction while the work is clamped to the carriage and the weld is being made. While I have shown separate means for effecting and controlling the various operations of the apparatus illustrated it will be understood that properly synchronized, automatic control means may be employed if desired. The inducing unit 74 may be reciprocated in a similar manner and by means similar to those shown in the drawing for reciprocating the inducing unit 3. In Figs. 4 and 5, a motor 103 is shown geared to rotate a crank 104 which is connected by a connecting rod 105 to the frame of the inducing unit 74. The throw of crank 104 may be adjusted in known manner to vary the length of the reciprocations of the inducing unit.

The operation of the apparatus shown in Figs. 4, 5, 6 and 7 for welding plates 71, 72 together is as follows:

Plate 71 is first set in the position shown in Fig. 6. It will be understood that this may be done in any convenient manner either by feeding the plate through the machine from left to right upon rolls 85 and 87 or by feeding the plate from right to left upon rolls 85 and 87 into the position where its edge which is to be joined to the edge of plate 72 stands about central with the magnetic poles and core 101, 102. Plate 72 is then fed from left to right into edge abutment with plate 71. The pairs of jaws 88, 89, and 88a, 89a, are then closed and the screws 90 are operated by means of motor 93 to bring the abutting edges of plates 71 and 72 into electrical contact with each other. The inducing unit 74 is then started upon its reciprocating movements and the switch is closed to send alternating electric current through the inducing coils 6. Electric currents will thus be induced to flow in large volumes across the seam 73. These currents being localized in the spaces between the magnetic poles 101, if these poles were to remain stationary the length of the seam 73 would not be quickly heated uniformly to a welding temperature as time would be required for the heat developed in the work lying between the poles to be conducted to the work lying under the poles. By reciprocating the poles, the zones of current flow will be shifted back and forth in the metal of the work so that there will be no alternate hotter and cooler portions but the edges of the entire length of the seam will be quickly and uniformly heated. As the welding temperature is reached the screws 90 may be operated to force the plates 71, 72 firmly together to complete the weld. The energizing current may be cut off substantially simultaneously with the attainment of welding temperature and the application of welding pressure to the seam edges, as will be understood by those skilled in the art. The jaws 88, 89 and 88a, 89a, may now be opened, the inducing unit may be raised by the cables 75, 76 actuated by motor 106, and the welded plates 71, 72 may be conveyed out of the machine upon the rolls 85, 87. It will be understood that if a series of more than two plates is to be welded together, plate 72 will be stopped in its movement out of the machine when its left hand edge is in the plane of the magnetic poles of the inducing unit. The carriage 81, being movable upon rails 83, the proper positioning of the work and the carriage can be readily and quickly effected.

During the welding operation there may be considerable downward force exerted upon the inducing unit so that the rolls 78a may bear upon the plate 72 with considerable pressure. In order that the movement of the plate 72 toward the plate 71 may not be unduly resisted by the rolls 78a, particularly when the weld is being completed, I prefer to provide for axial movement of the rolls 78a upon their shafts as shown in Fig. 7. With this provision movement of the work 72 to the right as seen in Fig. 7 may carry the rolls 78a along with it as the rolls may move axially upon their shafts. Springs 80 placed between the rolls and their supporting brackets 77a will return the rolls to the left hand limit of their axial movement as shown in Fig. 7 as soon as the pressure of the rolls upon the work is released.

When it is desired to progressively heat the work in a direction transverse to the direction of the reciprocating movements of the current inducing magnetic fields, the carriage 81 may remain stationary with the clamping jaws 88, 89 and 88a, 89a open and the work may be fed continuously past the inducing unit while the latter is energized and being reciprocated.

The term cylinder, as used in this specification and claims, is intended to include any hollow metal shell to which the invention may be applied, and is not limited to strictly cylindrical articles of circular cross section, as it is obvious that tapered drums, cone frustra, oval or elliptical cross section tanks, et cetera, may be heated or welded by the use of my invention.

I claim:

1. In apparatus of the class described, a work support, means for causing a plurality of fields of alternating magnetic force to cut the work on said support, and means for causing relative reciprocating movements of said fields and said work.

2. In apparatus of the class described, a work support, an inducing unit supported adjacent to the work on said work support, and means for causing relative reciprocating movements of the inducing unit and the work.

3. In apparatus of the class described, a work support, means for causing a plurality of fields of alternating magnetic force to cut the work on said support, and means for causing said fields of force and the work to be repeatedly shifted relatively to each other whereby the zones of heat resulting from the induced current flowing in said work are repeatedly extended to meet or overlap.

4. In apparatus of the class described, a work support, means for causing the work on said support to be cut by fields of alternating magnetic force in spaced-apart zones of said work, and means for causing the fields of force and the work to be repeatedly shifted relatively to each other a distance equal to not less than substantially half the distance between the centers of said zones.

5. In apparatus of the class described, a work support, means for causing a field of alternating magnetic force to cut the work on said support, and means for causing relative reciprocating movements of said field and said work.

6. In apparatus of the class described, a work support, means for causing a field of alternating magnetic force to cut the work on said support, means for causing relative reciprocating movements of said field and said work and means for causing progressive relative traversing movement of said field and said work parallel to said reciprocating movements.

7. In apparatus of the class described, a work support, means for causing a field of alternating magnetic force to cut the work on the work support, means for causing relative reciprocating movements of said field and said work and means for causing progressive relative traversing movement of said field and said work transverse to said reciprocating movements.

8. The method of electrically welding together an open seam in metal which consists in causing the opposite surfaces of the seam to be pressed together, causing electric currents to be induced in the metal and to flow across said seam in spaced-apart zones and simultaneously causing relative reciprocating movements of said metal and said zones.

9. The method of electrically heating metal which consists in causing electric currents to be induced in the metal and to flow in spaced apart zones in the metal and simultaneously causing relative reciprocating movements of said metal and said zones.

10. The method of electrically welding together an open seam in metal which consists in causing the opposite surfaces of the seam to be pressed together, causing electric currents to be induced in the metal and to flow across said seam in spaced-apart zones, simultaneously causing relative reciprocating movements of said metal and said zones and simultaneously causing progressive, relative traversing movement of said zones and said metal parallel to said reciprocating movements.

11. The method of electrically heating metal which consists in causing electric currents to be induced in the metal and to flow in spaced-apart zones in the metal, simultaneously causing relative reciprocating movements of said metal and said zones, and simultaneously causing progressive, relative traversing movement of said zones and said metal transverse to said reciprocating movements.

12. The method of electrically heating metal which consists in causing electric currents to be induced in the metal and to flow in adjoining spaced zones in the metal, simultaneously causing relative reciprocating movements of said metal and said zones, and simultaneously causing progressive, relative traversing movement of said zones and said metal parallel to said reciprocating movements.

13. In apparatus of the class described, means for supporting and moving sheet metal in the plane thereof, an inducing unit comprising a plurality of electric conductor coils disposed adjacent to and spaced transversely to the path of movement of said sheet metal, means for causing alternating electric current to flow in said coils to cause magnetic fields of force of successively opposite polarity to cut said sheet metal, and means for causing relative reciprocating movements of said inducing unit and said sheet metal.

14. In apparatus of the class described, means for supporting and moving sheet metal in the plane thereof, an inducing unit comprising a plurality of electric conductor coils disposed adjacent to and spaced transversely to the path of movement of said sheet metal, a magnetic core for said inducing unit, magnetic poles between said coils extending from said core into close proximity to the path of movement of said sheet metal, means for causing alternating electric current to flow in said coils to cause adjacent poles to be of opposite magnetic polarity, and means for causing relative reciprocating movements of said inducing unit and said sheet metal.

15. The method of electrically welding together an open seam in metal which consists in causing electric currents to be induced in the metal and to flow across said seam in spaced-part zones, simultaneously causing relative reciprocating movements of said metal and said zones, and applying welding pressure to said seam.

16. The method of electrically welding together an open seam in metal which consists in causing electric currents to be induced in the metal and to flow across said seam in spaced-apart zones, simultaneously causing relative reciprocating movements of said metal and said zones, simultaneously causing progressive, relative traversing movement of said zones and said metal parallel to said reciprocating movements, and applying welding pressure to said seam.

17. In apparatus of the class described, a work support, means for causing a field of alternating magnetic force to cut the work on said support, means for causing relative reciprocating movements of said field and said work and means for causing progressive relative traversing movement of said field and said work.

18. The method of electrically welding together an open seam in metal which consists in causing the opposite surfaces of the seam to be pressed together, causing electric currents to be induced in the metal and to flow across said seam in spaced-apart zones, causing relative reciprocating movements of said metal and said zones and causing progressive, relative traversing movement of said zones and said metal.

19. The method of electrically heating metal which consists in causing electric currents to be induced in the metal and to flow in spaced-apart zones in the metal, causing relative reciprocating movement of said metal and said zones, and causing progressive, relative traversing movement of said zones and said metal.

20. The method of electrically welding together an open seam in metal which consists in causing electric currents to be induced in the metal and to flow across said seam in spaced-apart zones, causing relative reciprocating movements of said metal and said zones, causing progressive, relative traversing movement of said zones and said metal, and applying welding pressure to said seam.

21. The method of electrically heating or welding metal which consists in causing electric current to be induced in the metal by causing said metal to be cut by a magnetic field and causing relative reciprocating movements of said metal and said field.

22. The method of electrically heating or welding metal which consists in causing electric current to be induced in the metal by causing said metal to be cut by a magnetic field, causing relative reciprocating movements of said metal and said field and causing progressive, relative traversing movement of said field and said metal.

23. Apparatus for electrically heating or welding metal comprising a support for the metal, an inducing unit, means for supporting said inducing unit adjacent said metal, roller means supported in definite relation to said inducing unit and adapted to contact with and roll against the adjacent surface of said metal, and means for causing relative reciprocating movements of said inducing unit and said metal.

24. Apparatus for welding a longitudinal seam in a metal cylinder comprising a support, an arm pivoted on said support for movements transverse to the axis of said cylinder, said arm having a portion adapted to engage the inner surface of said cylinder adjacent one side of the seam to be welded, and supporting means engaging the outer surface of said cylinder.

25. Apparatus for welding a longitudinal seam in a metal cylinder comprising a support, an arm pivoted on said support for movements transverse to the axis of said cylinder, said arm having a portion adapted to engage the inner surface of said cylinder adjacent one side of the seam to be welded, means adapted to engage the inner surface of said cylinder adjacent the other side of said seam, and supporting means engaging the outer surface of said cylinder.

26. Apparatus for the electric induction welding of a longitudinal seam in a metal cylinder comprising a support, a magnetic core mounted on said support, said core having a face in close proximity to the inner surface of said cylinder, an arm pivoted on said support for movements transverse to the axis of said cylinder, said arm having a portion adapted to engage the inner surface of said cylinder adjacent one side of the seam to be welded, supporting means engaging the outer surface of said cylinder, and an inducing unit mounted outside of said cylinder opposite said magnetic core.

27. Apparatus for welding a longitudinal seam in a metal cylinder comprising a support, a pair of arms pivoted on said support for movements transverse to the axis of said cylinder, said arms having portions adapted to engage the inner surface of said cylinder, one of said arms being adapted to contact with said inner surface on one side of said seam, the other of said arms being adapted to contact with said inner surface on the other side of said seam, and supporting means engaging the outer surface of said cylinder.

28. Apparatus for the electric induction welding of a longitudinal seam in a metal cylinder comprising a support, a magnetic core mounted on said support, said core having a face in close proximity to the inner surface of said cylinder, a pair of arms pivoted on said support for movements transverse to the axis of said cylinder, said arms having portions adapted to engage the inner surface of said cylinder, one of said arms being adapted to contact with said inner surface on one side of said seam, the other of said arms being adapted to contact with said inner surface on the other side of said seam, supporting means engaging the outer surface of said cylinder, and an inducing unit mounted outside of said cylinder opposite said magnetic core.

29. Apparatus for welding a longitudinal seam in a metal cylinder comprising a support, an arm pivoted on said support for movements transverse to the axis of said cylinder, said arm having a longitudinally extending portion adapted to engage the inner surface of said cylinder on one side of the seam to be welded, a longitudinally extending bar adapted to engage the outer surface of said cylinder opposite said portion, an arcuate clamp connected at one end to said bar and pivotally supported at the other end, means for moving said clamp about its pivot towards and away from the axis of said cylinder, means adapted to engage the inner surface of said cylinder on the other side of the seam to be welded, and means adapted to engage the outer surface of said cylinder on said other side of the seam to be welded.

30. Apparatus for welding a longitudinal seam in a metal cylinder comprising a support, a pair of arms pivoted on said support for movements transverse to the axis of said cylinder, said arms having portions adapted to engage the inner surface of said cylinder, the portion on one of said arms being adapted to contact with said inner surface on one side of said seam, the portion on the other of said arms being adapted to contact with said inner surface on the other side of said seam, a longitudinally extending bar adapted to engage the outer surface of said cylinder on one side of said seam opposite one of said portions, a longitudinally extending bar adapted to engage the outer surface of said cylinder on the other side of said seam opposite the other of said portions, and means for exerting welding pressure on said seam.

31. Apparatus for welding a longitudinal seam in a metal cylinder comprising a support, a pair of arms pivoted on said support for movements transverse to the axis of said cylinder, said arms having portions adapted to engage the inner surface of said cylinder on the opposite sides of said seam, means adapted to move said portions apart, and supporting means engaging the outer surface of said cylinder.

32. Apparatus for welding a longitudinal seam in a metal cylinder comprising a support, an arm pivoted on said support for movements transverse to the axis of said cylinder, said arm having a longitudinally extending portion adapted to engage the inner surface of said cylinder on one side of the seam to be welded, a longitudinally extending bar adapted to engage the outer surface of said cylinder opposite said portion, an arcuate clamp connected at one end to said bar and pivotally supported at the other end, means for moving said clamp about its pivot towards and away from the axis of said cylinder, means adapted to limit the movement of said clamp towards the axis of said cylinder, means adapted to engage the inner surface of said cylinder on the other side of the seam to be welded, and means adapted to engage the outer surface of said cylinder on said other side of the seam to be welded.

33. Apparatus for welding a longitudinal seam in a metal cylinder comprising a support, an arm pivoted on said support for movements transverse to the axis of said cylinder, said arm having a longitudinally extending portion adapted to engage the inner surface of said cylinder on one side of the seam to be welded, a longitudinally extending bar adapted to engage the outer surface of said cylinder opposite said portion, means for moving said bar towards and away from the other side of the seam to be welded, means adapted to limit the extent of movement of said bar towards said other side of the seam to be welded, means adapted to engage the inner surface of said cylinder on the other side of the seam to be welded, and means adapted to engage the outer surface of said cylinder on said other side of the seam to be welded.

34. The method of electrically welding together an open seam in metal which consists in causing electric currents to flow across said seam in spaced-apart zones, simultaneously causing relative movement of said metal and said zones in a direction parallel to said seam, but only for a distance substantially equal to the space between two successive zones, and pressing together the opposite edges of said seam.

35. In apparatus for welding a longitudinal seam in a metal article, means for causing electric currents to flow across said seam simultaneously in spaced-apart zones approximately evenly spaced along substantially the entire length of said metal article, and means for causing relative movement of said metal article and said zones in a direction parallel to said seam, the extent of said movement being limited during the period of current flow to a distance substantially equal to the space between two successive zones, and means for pressing together the edges of said seam.

36. In apparatus for welding a longitudinal seam in a metal cylinder, a support, movable means mounted on said support and adapted for movements transverse to the axis of said cylinder, said movable means having a portion adapted to engage the inner surface of said cylinder on one side of the seam to be welded, and supporting means engaging the outer surface of said cylinder.

37. In combination with apparatus for welding a longitudinal seam in a metal cylinder, a support, movable means mounted on said support and adapted for movements transverse to the axis of said cylinder, said movable means having a portion adapted to engage the inner surface of said cylinder on one side of the seam to be welded, another movable means mounted on said support and adapted for movements transverse to the axis of said cylinder, said last named movable means having a portion adapted to engage the inner surface of said cylinder on the other side of said seam, and supporting means engaging the outer surface of said cylinder.

38. Apparatus for welding a longitudinal seam in a metal cylinder comprising a support, a pair of longitudinally-extending, internal members mounted on said support, one member of said pair being adapted to engage the inner surface of said metal cylinder on one side of said seam, the other member of said pair being adapted to engage said inner surface on the other side of said seam, a longitudinally-extending member adapted to engage the outer surface of said cylinder on one side of said seam opposite one member of said pair of internal members, a longitudinally-extending member adapted to engage the outer surface of said cylinder on the other side of said seam opposite the other member of said pair of internal members, and means for pressing together the edges of said seam.

FRANK L. SESSIONS.